(12) United States Patent
Tai et al.

(10) Patent No.: US 12,723,169 B2
(45) Date of Patent: Sep. 1, 2026

(54) PHOTOSENSITIVE RESIN COMPOSITION, CURED PRODUCT AND MANUFACTURING METHOD THEREOF, LIGHT CONVERSION LAYER AND LIGHT EMITTING DEVICE

(71) Applicant: Advanced Echem Materials Company Limited, Taoyuan (TW)

(72) Inventors: Chun-Kuan Tai, Taoyuan (TW); Ya-Qian Chen, Taoyuan (TW); Yu-Chun Chen, Taoyuan (TW)

(73) Assignee: Advanced Echem Materials Company Limited, Taoyuan (TW)

( * ) Notice: Subject to any disclaimer, the term of this patent is extended or adjusted under 35 U.S.C. 154(b) by 533 days.

(21) Appl. No.: 18/352,210

(22) Filed: Jul. 13, 2023

(65) Prior Publication Data

US 2024/0018379 A1 Jan. 18, 2024

(30) Foreign Application Priority Data

Jul. 14, 2022 (TW) ................................. 111126379

(51) Int. Cl.
*C09D 11/50* (2014.01)
*C09D 11/033* (2014.01)
(Continued)

(52) U.S. Cl.
CPC ............ *C09D 11/50* (2013.01); *C09D 11/033* (2013.01); *C09D 11/037* (2013.01); (Continued)

(58) Field of Classification Search
CPC ...................................................... C09D 11/50
See application file for complete search history.

(56) References Cited

FOREIGN PATENT DOCUMENTS

CN 1054324 9/1991
CN 102981366 3/2013
(Continued)

OTHER PUBLICATIONS

English Machine Translation of CN 108415221 (Year: 2026).*
"Office Action of Taiwan Counterpart Application", issued on Feb. 23, 2023, p. 1-p. 5.

*Primary Examiner* — Chanceity N Robinson
(74) *Attorney, Agent, or Firm* — JCIPRNET

(57) ABSTRACT

A photosensitive resin composition, a cured product and a manufacturing method thereof, a light conversion layer and a light emitting device are provided. The photosensitive resin composition includes a resin (A), an ethylenically unsaturated monomer (B), a photopolymerization initiator (C), a pigment (D) and a solvent (E). The resin (A) includes an alkali-soluble resin (A-1), other resin (A-2) or the combination thereof. The alkali-soluble resin (A-1) includes a structural unit represented by the following formula (A1). The photopolymerization initiator (C) includes a compound represented by the following formula (C1).

Formula (A1)

(Continued)

-continued

Formula (C1)

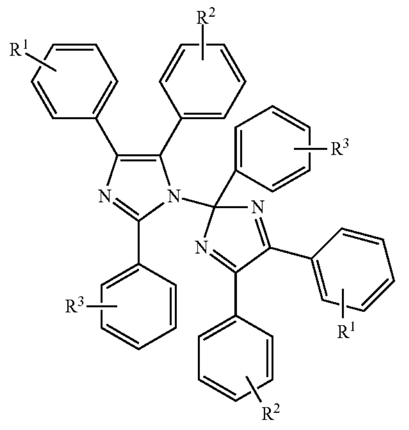

In formula (A1) and formula (C1), the definition of each substituent is the same as that in the detailed description.

22 Claims, 3 Drawing Sheets

(51) Int. Cl.

| | |
|---|---|
| ***C09D 11/037*** | (2014.01) |
| ***C09D 11/101*** | (2014.01) |
| ***C09D 11/107*** | (2014.01) |
| ***C09D 11/322*** | (2014.01) |
| ***C09D 11/36*** | (2014.01) |
| ***C09D 11/38*** | (2014.01) |
| ***G02F 1/1335*** | (2006.01) |
| ***G02F 1/13357*** | (2006.01) |

(52) U.S. Cl.
CPC .......... *C09D 11/101* (2013.01); *C09D 11/107* (2013.01); *C09D 11/322* (2013.01); *C09D 11/36* (2013.01); *C09D 11/38* (2013.01); *G02F 1/133614* (2021.01); *G02F 1/133621* (2013.01)

(56) References Cited

FOREIGN PATENT DOCUMENTS

| | | | | | |
|---|---|---|---|---|---|
| CN | 108415221 A | * | 8/2018 | ........... | G03F 7/0007 |
| JP | 2001255652 | | 9/2001 | | |
| JP | 2009223205 | | 10/2009 | | |
| TW | 530167 | | 5/2003 | | |
| TW | I571705 | | 2/2017 | | |
| TW | I577739 | | 4/2017 | | |
| TW | I598693 | | 9/2017 | | |
| TW | 201830135 | | 8/2018 | | |
| TW | I638234 | | 10/2018 | | |
| TW | 201906875 | | 2/2019 | | |
| TW | 201912763 | | 4/2019 | | |
| TW | I667534 | | 8/2019 | | |
| TW | I671589 | | 9/2019 | | |
| TW | 201939164 | | 10/2019 | | |
| TW | 201945847 | | 12/2019 | | |
| TW | I691794 | | 4/2020 | | |
| TW | 202212260 | | 4/2022 | | |
| WO | 2020179744 | | 9/2020 | | |

* cited by examiner 140 142 144 146 148
160 160P 162 164 166
168

PHOTOSENSITIVE RESIN COMPOSITION, CURED PRODUCT AND MANUFACTURING METHOD THEREOF, LIGHT CONVERSION LAYER AND LIGHT EMITTING DEVICE

CROSS-REFERENCE TO RELATED APPLICATION

This application claims the priority benefit of Taiwan application serial no. 111126379, filed on Jul. 14, 2022. The entirety of the above-mentioned patent application is hereby incorporated by reference herein and made a part of this specification.

BACKGROUND

Technical Field

The disclosure relates to a resin composition, particularly to a photosensitive resin composition, a cured product and a manufacturing method thereof, a light conversion layer and a light emitting device.

Description of Related Art

With the development of display device technologies, in order to improve the display quality of the display device, a light conversion layer including quantum dots is provided in the display device in recent years to improve the brightness and color purity of the display screen. In addition, in order to improve the flexibility of the display device, the traditional glass substrate is often replaced by a flexible soft substrate in recent years. However, quantum dots and flexible soft substrates have a phenomenon of poor resistant to high temperature, thereby affecting the color purity and performance of the light conversion layers manufactured therefrom them and the devices using the same.

SUMMARY

The disclosure provides a photosensitive resin composition, a cured product and a manufacturing method thereof, a light conversion layer and a light emitting device capable of providing good ink exudative resistance and ink infiltration resistance.

A photosensitive resin composition of the disclosure includes a resin (A), an ethylenically unsaturated monomer (B), a photopolymerization initiator (C), a pigment (D) and a solvent (E). The resin (A) includes an alkali-soluble resin (A-1), other resin (A-2) or a combination thereof. The alkali-soluble resin (A-1) includes a structural unit represented by Formula (A1) as follows. The photopolymerization initiator (C) includes a compound represented by Formula (C1) as follows.

Formula (A1)

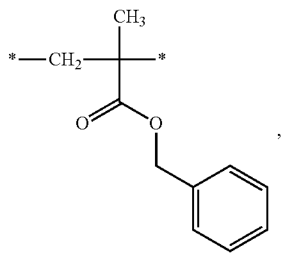

, wherein * represents a bonding position.

Formula (C1)

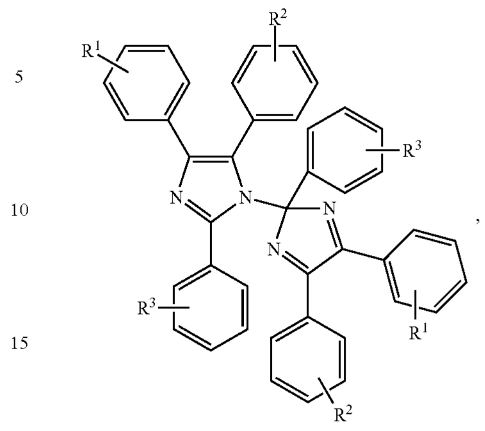

, in Formula (C1), $R^1$ represents hydrogen or methoxy group, $R^2$ represents hydrogen, fluorine, chlorine, bromine, methyl group or methoxy group, $R^3$ represents fluorine, chlorine, bromine, methyl group or methoxy group.

In an embodiment of the disclosure, a weight average molecular weight of each resin in the alkali-soluble resin (A-1) is greater than 13,000 and less than or equal to 85,000.

In an embodiment of the disclosure, an acid value of each of the alkali-soluble resin (A-1) and the other resin (A-2) is 60 mgKOH/g to 135 mgKOH/g.

In an embodiment of the disclosure, the alkali-soluble resin (A-1) includes one or more alkali-soluble resin including the structural unit represented by Formula (A1). In the alkali-soluble resin (A-1), based on a sum of 100 mol % of all the structural units included in each alkali-soluble resin in which the alkali-soluble resin includes the structural unit represented by Formula (A1), the structural unit represented by Formula (A1) is 35 mol % to 65 mol %.

In an embodiment of the disclosure, the ethylenically unsaturated monomer (B) includes alkyl (meth)acrylate, hydroxyl-containing (meth)acrylate, ether group-containing (meth)acrylate, alicyclic (meth)acrylate, or a combination thereof.

In an embodiment of the disclosure, the ethylenically unsaturated monomer (B) includes (meth)acrylic acid, methyl (meth)acrylate, ethyl (meth)acrylate, propyl (meth)acrylate, butyl (meth)acrylate, tert-butyl (meth)acrylate, lauryl (meth)acrylate, hydroxyethyl (meth)acrylate, hydroxypropyl (meth)acrylate, ethoxyethyl (meth)acrylate, glycidyl (meth)acrylate, cyclohexyl (meth)acrylate, dicyclopentadienyl (meth)acrylate, or a combination thereof.

In an embodiment of the disclosure, the photopolymerization initiator (C) further includes a compound represented by Formula (C2) as follows:

Formula (C2)

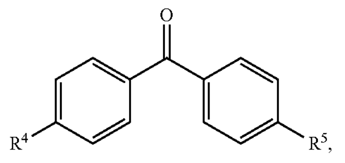

, in Formula (C2), $R^4$ and $R^5$ each represent methylamino group, ethylamino group, cyclohexylamino group, hydroxyethylamino group, methoxy group, methylethylamino group or diethylamino group.

In an embodiment of the disclosure, in the photopolymerization initiator (C), a weight ratio of a usage amount of the compound represented by Formula (C1) to a usage amount of the compound represented by Formula (C2) is 5:1 to 2:1.

In an embodiment of the disclosure, the pigment (D) includes a white pigment (D-1). The white pigment (D-1) is at least one selected from the group consisting of titanium oxide, silicon oxide, barium titanate, zirconium oxide, zinc oxide, aluminum oxide, magnesium oxide, antimony oxide, aluminum hydroxide, magnesium hydroxide, barium sulfate, calcium sulfate, magnesium carbonate, barium carbonate, calcium carbonate, strontium titanate, aluminum powder, kaolin, clay, talcum powder, and montmorillonite.

In an embodiment of the disclosure, the pigment (D) includes a black pigment (D-2). The black pigment (D-2) is at least one selected from the group consisting of carbon black, chromium oxide, iron oxide, and titanium black.

In an embodiment of the disclosure, the solvent (E) includes a low boiling point solvent (E-1). A boiling point of the low boiling point solvent (E-1) is 100° C. or less.

In an embodiment of the disclosure, based on a usage amount of 100 parts by weight of the solvent (E), a usage amount of the low boiling point solvent (E-1) is 25 parts by weight to 100 parts by weight.

In an embodiment of the disclosure, the photosensitive resin composition further includes a surfactant (F). Based on a usage amount of 100 parts by weight of the resin (A), a usage amount of the surfactant (F) is 1 part by weight to 5 parts by weight.

In an embodiment of the disclosure, the photosensitive resin composition further includes a surfactant (F). The surfactant (F) includes a fluorine-based surfactant.

In an embodiment of the disclosure, based on a usage amount of 100 parts by weight of the resin (A), a usage amount of the ethylenically unsaturated monomer (B) is 5 parts by weight to 25 parts by weight, a usage amount of the photopolymerization initiator (C) is 0.1 parts by weight to 5 parts by weight, a usage amount of the pigment (D) is 45 parts by weight to 65 parts by weight, and a usage amount of the solvent (E) is 20 parts by weight to 65 parts by weight.

A cured product of the disclosure is formed by curing the photosensitive resin composition described above.

A manufacturing method of a cured product of the disclosure includes performing post-bake for the photosensitive resin composition described above. A temperature of the post-bake is less than or equal to 150° C.

A light conversion layer of the disclosure includes the cured product described above or a cured product manufactured by the manufacturing method of a cured product.

In an embodiment of the disclosure, the cured product is a plurality of cured products. The light conversion layer further includes a plurality of pattern layers. The plurality of cured products are interposed between the plurality of pattern layers, so that one of the plurality of pattern layers is present between every two adjacent cured products in the plurality of cured products.

In an embodiment of the disclosure, the light conversion layer further includes a plurality of pattern layers. The pattern layers are a red pattern layer, a green pattern layer, or a scatterer pattern layer.

A light emitting device of the disclosure includes the light conversion layer described above.

In an embodiment of the disclosure, the light emitting device further includes a substrate and a backlight module. The light conversion layer is located on the substrate. The backlight module is disposed on a side of the substrate where the light conversion layer is disposed.

In an embodiment of the disclosure, the light emitting device further includes a light filter layer. The light filter layer is located between the substrate and the light conversion layer.

Based on the above, the photosensitive resin composition of the disclosure includes an alkali-soluble resin (A-1) including a structural unit represented by Formula (A1) and a photopolymerization initiator (C1) including a compound represented by Formula (C1). Thus, the photosensitive resin composition and the cured product formed therefrom may have good ink exudative resistance and ink infiltration resistance, thereby suitable for light conversion layer and light emitting device. In particular, the cured product formed by the photosensitive resin composition at a post-bake temperature of less than or equal to 150° C. may have good ink exudative resistance and ink infiltration resistance.

To make the features and advantages of the disclosure to be comprehended more easily, embodiments and drawings are described in detail as follows.

DESCRIPTION OF THE EMBODIMENTS

Figure 1:
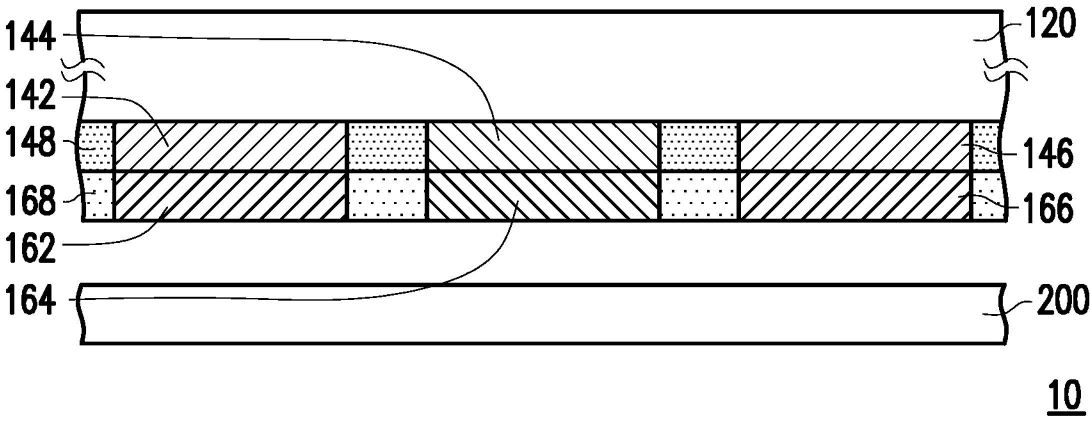
FIG. 1 is a diagram of a light emitting device according to an embodiment of the disclosure.

The disclosure will be described more fully hereinafter with reference to the accompanying drawings, in which exemplary embodiments of the disclosure are shown. As those skilled in the art would realize, the described embodiments may be modified in various different ways, and all without departing from the spirit or scope of the disclosure. In the drawings, the thickness of layers, films, panels, regions, etc., are exaggerated for clarity. The same reference numerals refer to the same elements throughout the specification.

<Photosensitive Resin Composition>

The disclosure provides a photosensitive resin composition including a resin (A), an ethylenically unsaturated monomer (B), a photopolymerization initiator (C), a pigment (D) and a solvent (E). In addition, the photosensitive resin composition of the disclosure may further include a surfactant (F) as needed. The components are described hereinafter in detail.

Resin (A)

The resin (A) includes an alkali-soluble resin (A-1), other resin (A-2) or a combination thereof. The resin (A) may further include other suitable resins.

The alkali-soluble resin (A-1) includes a structural unit represented by Formula (A1) as follows:

Formula (A1)

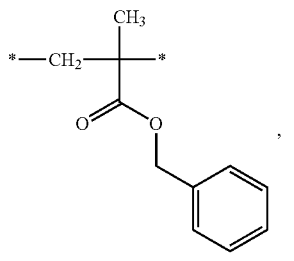

, wherein * represents a bonding position.

The alkali-soluble resin (A-1) may further include other structural units. Other structural unit is not particularly limited, and any suitable structural unit may be selected according to needs. For example, the alkali-soluble resin (A-1) may include at least one of a structural unit derived from acrylic-based compound, a structural unit derived from styrene-based compound and a structural unit derived from maleimide-based compound. For example, the alkali-soluble resin (A-1) may further include at least one of structural unit represented by Formula (A2) to Formula (A8) as Follows, wherein * represents a bonding position. The alkali-soluble resin (A-1) preferably further includes at least one of structural unit represented by Formula (A2) to Formula (A6).

Formula (A2)

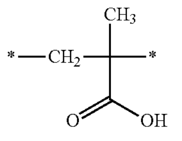

Formula (A3)

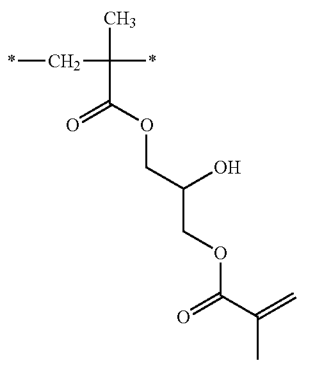

Formula (A4)

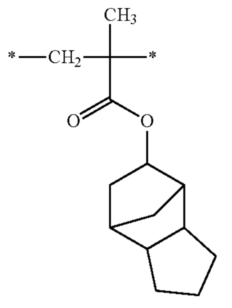

-continued

Formula (A5)

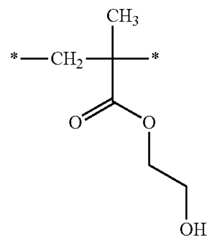

Formula (A6)

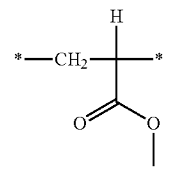

Formula (A7)

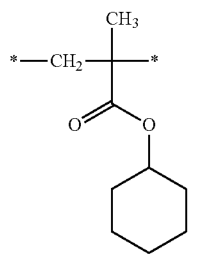

Formula (A8)

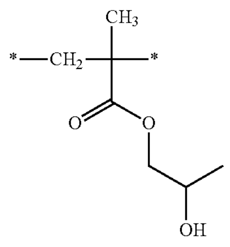

In this embodiment, the alkali-soluble resin (A-1) may include one or more alkali-soluble resin including the structural unit represented by Formula (A1). For example, the alkali-soluble resin including the structural unit represented by Formula (A1) may include a first alkali-soluble resin, a second alkali-soluble resin, a third alkali-soluble resin, or a combination thereof. The first alkali-soluble resin may include the structural unit represented by Formula (A1), the structural unit represented by Formula (A2) and the structural unit represented by Formula (A3). The second alkali-soluble resin may include the structural unit represented by Formula (A1), the structural unit represented by Formula (A2) and the structural unit represented by Formula (A4). The third alkali-soluble resin may include the structural unit represented by Formula (A1), the structural unit represented by Formula (A2), the structural unit represented by Formula (A5) and the structural unit represented by Formula (A6).

In this embodiment, a weight average molecular weight of each resin of the alkali-soluble resin (A-1) is greater than 13,000 and less than or equal to 85,000. For example, the alkali-soluble resin (A-1) may include the first alkali-soluble resin, the second alkali-soluble resin, the third alkali-soluble resin, or a combination thereof, wherein a weight average molecular weight of the first alkali-soluble resin, the second alkali-soluble resin and the third alkali-soluble resin are each greater than 13,000 and less than or equal to 85,000, preferably 55,000 to 85,000.

In this embodiment, an acid value of each resin of the alkali-soluble resin (A-1) is 60 mgKOH/g to 135 mgKOH/g. For example, the alkali-soluble resin (A-1) may include the first alkali-soluble resin, the second alkali-soluble resin, the third alkali-soluble resin, or a combination thereof, wherein an acid value of the first alkali-soluble resin, the second alkali-soluble resin and the third alkali-soluble resin are each 60 mgKOH/g to 135 mgKOH/g, preferably 70 mgKOH/g to 100 mgKOH/g.

In this embodiment, in the alkali-soluble resin (A-1), based on a sum of 100 mol % of all the structural units included in each alkali-soluble resin in which the alkali-soluble resin includes the structural unit represented by Formula (A1), the structural unit represented by Formula (A1) is 35 mol % to 65 mol %, preferably 35 mol % to 55 mol %. For example, the first alkali-soluble resin included in the alkali-soluble resin including the structural unit represented by Formula (A1) may include the structural unit represented by Formula (A1), the structural unit represented by Formula (A2) and the structural unit represented by Formula (A3), wherein based on a sum of 100 mol % of the structural unit represented by Formula (A1), the structural unit represented by Formula (A2) and the structural unit represented by Formula (A3), the structural unit represented by Formula (A1) is 35 mol % to 65 mol %. The second alkali-soluble resin included in the alkali-soluble resin including the structural unit represented by Formula (A1) may include the structural unit represented by Formula (A1), the structural unit represented by Formula (A2) and the structural unit represented by Formula (A4), wherein based on a sum of 100 mol % of the structural unit represented by Formula (A1), the structural unit represented by Formula (A2) and the structural unit represented by Formula (A4), the structural unit represented by Formula (A1) is 35 mol % to 65 mol %. The third alkali-soluble resin included in the alkali-soluble resin including the structural unit represented by Formula (A1) may include the structural unit represented by Formula (A1), the structural unit represented by Formula (A2), the structural unit represented by Formula (A5) and the structural unit represented by Formula (A6), wherein based on a sum of 100 mol % of the structural unit represented by Formula (A1), the structural unit represented by Formula (A2), the structural unit represented by Formula (A5) and the structural unit represented by Formula (A6), the structural unit represented by Formula (A1) is 35 mol % to 65 mol %.

Based on a usage amount of 100 parts by weight of the resin (A), a usage amount of the alkali-soluble resin (A-1) may be 5 parts by weight to 95 parts by weight, preferably 20 parts by weight to 70 parts by weight.

The other resin (A-2) does not include the structural unit represented by Formula (A1). The other resin (A-2) is not particularly limited, and any suitable resin may be selected according to needs. For example, the other resin (A-2) may include the structural unit represented by Formula (A2), the structural unit represented by Formula (A3), the structural unit represented by Formula (A4), the structural unit represented by Formula (A7) and the structural unit represented by Formula (A8). The other resin (A-2) may include one or more resin. A weight average molecular weight of each resin of the other resin (A-2) is 3,000 to 11,000, preferably 8,000 to 11,000. In this embodiment, an acid value of each resin of the other resin (A-2) is 60 mgKOH/g to 135 mgKOH/g, preferably 120 mgKOH/g to 132 mgKOH/g.

In the resin (A), a usage amount of the other resin (A-2) may be greater than that of the alkali-soluble resin (A-1). Based on a usage amount of 100 parts by weight of the resin (A), a usage amount of the other resin (A-2) may be 5 parts by weight to 95 parts by weight, preferably 30 parts by weight to 80 parts by weight.

When the photosensitive resin composition includes the alkali-soluble resin (A-1) and the alkali-soluble resin (A-1) includes the structural unit represented by Formula (A1), the cured product formed by the photosensitive resin composition at a post-bake temperature of less than or equal to 150° C. are able to provide good ink exudative resistance and ink infiltration resistance.

When the photosensitive resin composition includes the alkali-soluble resin (A-1), the alkali-soluble resin (A-1) includes the structural unit represented by Formula (A1) and the weight average molecular weight of each resin of the alkali-soluble resin (A-1) is greater than 13,000 and less than or equal to 85,000, the cured product formed by the photosensitive resin composition at a post-bake temperature of less than or equal to 150° C. are able to provide good ink exudative resistance and ink infiltration resistance.

Ethylenically Unsaturated Monomer (B)

The ethylenically unsaturated monomer (B) is not particularly limited, and any suitable ethylenically unsaturated monomer may be selected according to needs. In this embodiment, the ethylenically unsaturated monomer (B) includes alkyl (meth)acrylate, hydroxyl-containing (meth) acrylate, ether group-containing (meth)acrylate, alicyclic (meth)acrylate, or a combination thereof. The alkyl (meth) acrylate may include (meth)acrylic acid, methyl (meth) acrylate, ethyl (meth)acrylate, propyl (meth)acrylate, butyl (meth)acrylate, tert-butyl (meth)acrylate, lauryl (meth)acrylate or other suitable alkyl (meth)acrylates. The hydroxyl-containing (meth)acrylate may include hydroxyethyl (meth) acrylate, hydroxypropyl (meth)acrylate or other suitable hydroxyl-containing (meth)acrylates. The ether group-containing (meth)acrylate may include ethoxyethyl (meth)acrylate, glycidyl (meth)acrylate or other suitable ether group-containing (meth)acrylates. The alicyclic (meth)acrylate may include cyclohexyl (meth)acrylate, dicyclopentadienyl (meth)acrylate or other suitable alicyclic (meth)acrylates. In this embodiment, the ethylenically unsaturated monomer (B) is preferably ether group-containing (meth)acrylate.

For example, the ethylenically unsaturated monomer (B) may include a compound having two functional groups (i.e., bifunctional compound) such as 1,6-hexanediol diacrylate, diallyl terephthalate, ethylene glycol dimethacrylate, 9,9-bis [4-(2-hydroxy-3-acryloxypropoxy)phenyl]fluorene, 9,9-bis [4-(2-acryloxy ethoxy)phenyl]fluorene, bisphenol A diglycidyl ether; a compound having more than two functional groups (i.e., multifunctional compound) such as pentaerythritol triacrylate, ethoxylated pentaerythritol tetraacrylate, pentaerythritol pentaacrylate, pentaerythritol hexaacrylate; or a thiol compound having one or more thiol group such as trimethylolpropane tris(3-mercaptopropionate), 1,4-butanediol bis(3-mercaptobutyrate), tris[2-(3-mercaptopropoxy) ethyl]isocyanurate, pentaerythritol tetrakis(3-mercaptobutyrate). In this embodiment, the ethylenically unsaturated monomer (B) is preferably pentaerythritol pentaacrylate, pentaerythritol tetrakis(3-mercaptobutyrate), or a combination thereof.

Based on a usage amount of 100 parts by weight of the resin (A), a usage amount of the ethylenically unsaturated monomer (B) is 5 parts by weight to 25 parts by weight, preferably 16 parts by weight to 21 parts by weight.

Photopolymerization Initiator (C)

The photopolymerization initiator (C) includes a compound represented by Formula (C1) as follows:

Formula (C1)

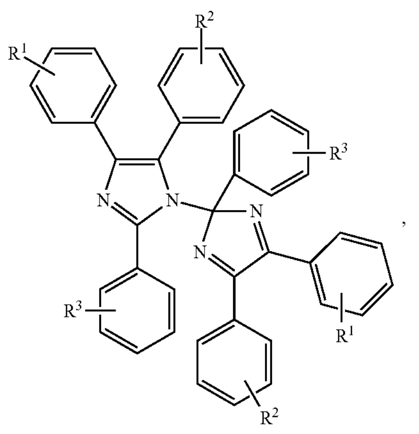

,

In Formula (C1), $R^1$ represents hydrogen or methoxy group, preferably hydrogen; $R^2$ represents hydrogen, fluorine, chlorine, bromine, methyl group or methoxy group, preferably hydrogen; $R^3$ represents fluorine, chlorine, bromine, methyl group or methoxy group, preferably methoxy group.

The photopolymerization initiator (C) may further include other photopolymerization initiator. For example, the photopolymerization initiator (C) may further include a hexaarylbiimidazole-based compound, a benzophenone-based compound, a thioxanthone-based compound, a diphenylphosphine oxide-based compound, a triazine-based compound, an acetophenone-based compound, a quinone-based compound, a phosphine oxide, an oxime ester-based compound or other suitable photopolymerization initiators. The photopolymerization initiator (C) may be used alone or in combination. In this embodiment, the photopolymerization initiator (C) is preferably a hexaarylbiimidazole-based compound, a benzophenone-based compound, or a combination thereof.

In this embodiment, the photopolymerization initiator (C) may further include a compound represented by Formula (C2) as follows:

Formula (C2)

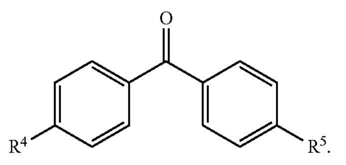

In Formula (C2), $R^4$ and $R^5$ each represent methylamino group, ethylamino group, cyclohexylamino group, hydroxyethylamino group, methoxy group, methylethylamino group or diethylamino group, preferably diethylamino group.

In the photopolymerization initiator (C), a weight ratio of a usage amount of the compound represented by Formula (C1) to a usage amount of the compound represented by Formula (C2) is 5:1 to 2:1, preferably 4:1 to 3:1.

Based on a usage amount of 100 parts by weight of the resin (A), a usage amount of the photopolymerization initiator (C) is 0.1 parts by weight to 5 parts by weight, preferably 0.9 parts by weight to 2 parts by weight.

When the photosensitive resin composition includes the photopolymerization initiator (C) and the photopolymerization (C) includes a compound represented by Formula (C1), the cured product formed by the photosensitive resin composition at a post-bake temperature of less than or equal to 150° C. are able to provide good ink exudative resistance and ink infiltration resistance.

When the photosensitive resin composition includes the photopolymerization initiator (C), the photopolymerization (C) includes a compound represented by Formula (C1) and further includes a compound represented by Formula (C2), the cured product formed by the photosensitive resin composition at a post-bake temperature of less than or equal to 150° C. are able to provide good ink exudative resistance and ink infiltration resistance.

Pigment (D)

The pigment (D) is not particularly limited, and any suitable pigment may be selected according to needs. In this embodiment, the pigment (D) may include a white pigment (D-1). In addition, the pigment (D) may further include a black pigment (D-2).

In this embodiment, the white pigment (D-1) may be at least one selected from the group consisting of titanium oxide, silicon oxide, barium titanate, zirconium oxide, zinc oxide, aluminum oxide, magnesium oxide, antimony oxide, aluminum hydroxide, magnesium hydroxide, barium sulfate, calcium sulfate, magnesium carbonate, barium carbonate, calcium carbonate, strontium titanate, aluminum powder, kaolin, clay, talcum powder, and montmorillonite, preferably titanium oxide (e.g. titanium dioxide).

The pigment (D) may further include a black pigment (D-2). The black pigment (D-2) is at least one selected from the group consisting of carbon black, chromium oxide, iron oxide, and titanium black, preferably at least one selected from the group consisting of carbon black and titanium black.

Based on a usage amount of 100 parts by weight of the resin (A), a usage amount of the pigment (D) is 45 parts by weight to 65 parts by weight, preferably 51 parts by weight to 64 parts by weight. In the pigment (D), a usage amount of the white pigment (D-1) may be greater than that of the black pigment (D-2). Based on a usage amount of 100 parts by weight of the resin (A), the usage amount of the white pigment (D-1) is 35 parts by weight to 65 parts by weight, preferably 51 parts by weight to 64 parts by weight.

Solvent (E)

The solvent (E) is not particularly limited, and any suitable solvent may be selected according to needs. In this embodiment, the solvent (E) may include a low boiling point solvent (E-1). A boiling point of the low boiling point solvent (E-1) is 100° C. or less. For example, the low boiling point solvent (E-1) may include butanone, ethyl acetate, dioxolane, 1,3-butanediol diacetate or other suitable low boiling point solvents. In addition, the solvent (E) may further include a solvent having a boiling point more than 100° C., such as propylene glycol monomethyl ether, methyl isobutyl ketone, methoxy propyl acetate (PMA), dipropylene glycol dimethyl ether, 1,2-propylene glycol diacetate, 3-cyclohexene-1-methanol, 1,4-butanediol diacetate, 1,6-diacetoxyhexane, 3-methoxybutyl acetate, ethylene glycol butyl ether acetate, diethylene glycol monoethyl ether acetate, diethylene glycol butyl ether acetate, triacetin, 1,3-butanediol, diethylene glycol ethyl ether, ethylene glycol diethyl ether, ethylene glycol dibutyl ether, ethylene glycol methyl ether acetate, ethylene glycol ethyl ether acetate or other suitable solvents. For example, the solvent (E) may include the low boiling point solvent (E-1) and an appropriate amount of another solvent, wherein the other solvent may be used to dilute or disperse the pigment (D). The solvent (E) may be used alone or in combination. In this embodiment, the solvent (E) is preferably butanone, ethyl acetate, or a combination thereof, preferably butanone.

Based on a usage amount of 100 parts by weight of the resin (A), a usage amount of the solvent (E) is 20 parts by weight to 65 parts by weight, preferably 24 parts by weight to 53 parts by weight. Based on a usage amount of 100 parts by weight of the solvent (E), a usage amount of the low boiling point solvent (E-1) is 25 parts by weight to 100 parts by weight, preferably 35 parts by weight to 100 parts by weight.

When the photosensitive resin composition includes the solvent (E), the photosensitive resin composition is able to have appropriate viscosity, which provides good coating uniformity.

Surfactant (F)

The surfactant (F) is not particularly limited, and any suitable surfactant may be selected according to needs. For example, the surfactant (F) may include a cationic-based surfactant, an anionic-based surfactant, a nonionic-based surfactant, an amphoteric-based surfactant, a polysiloxane-based surfactant, a fluorine-based surfactant or other suitable surfactants. The surfactant (F) may be used alone or in combination. In this embodiment, the surfactant (F) is preferably a polysiloxane-based surfactant, a fluorine-based surfactant, or a combination thereof, preferably a fluorine-based surfactant.

Based on a usage amount of 100 parts by weight of the resin (A), a usage amount of the surfactant (F) is 1 part by weight to 5 parts by weight, preferably 1 part by weight to 3 parts by weight.

<Preparation Method of Photosensitive Resin Composition>

The preparation method of the photosensitive resin composition is not particularly limited. For example, the resin (A), the ethylenically unsaturated monomer (B), the photopolymerization initiator (C), the pigment (D) and the solvent (E) are stirred in a mixer to be mixed uniformly into a solution state, and a surfactant (F) may also be added if necessary. After mixing them uniformly, a liquid photosensitive resin composition is obtained.

<Cured Product and Manufacturing Method Thereof>

An exemplary embodiment of the disclosure provides a cured product formed by the photosensitive resin composition above. In addition, an exemplary embodiment of the disclosure provides a manufacturing method of a cured product, wherein the manufacturing method includes performing post-bake for the photosensitive resin composition described above, and a temperature of the post-bake is less than or equal to 150° C.

The cured product may be formed by coating the photosensitive resin composition above on a substrate to form a coating film and performing pre-bake, exposure, development, and post-bake on the coating film. For example, after the photosensitive resin composition is coated on the substrate to form a coating film, vacuum dry is performed first, followed by baking before the exposure (i.e. pre-bake) at a temperature of 90° C. for 1 minute. Next, the pre-baked coating film is exposed by using a photomask with predetermined pattern and controlling the distance between the film surface and the photomask of 100 μm, and using a high-pressure mercury lamp at 150 $mJ/cm^2$. Then, the exposed coating film is developed for 60 seconds. Next, the developed coating film was washed with distilled water and nitrogen gas was blown to dry the coating film. Then, post-bake is performed at less than or equal to 150° C. for 60 minutes to form a cured product on the substrate.

The substrate may be a glass substrate, a plastic base material (for example, a polyether sulfone (PES) board, a polycarbonate (PC) board, or a polyimide (PI) film), or other light-transmitting substrates, and the type thereof is not particularly limited.

The coating method is not particularly limited, but a spray coating method, a roll coating method, a spin coating method, or the like may be used, and in general, a spin coating method is widely used. In addition, a coating film is formed, and then, in some cases, residual solvent may be partially removed under reduced pressure.

The developing solution is not particularly limited, and a suitable developing solution may be selected as needed. For example, the developing solution may be sodium hydrogen carbonate ($NaHCO_3$) solution, and the concentration thereof may be 0.1 wt %.

<Light Emitting Device>

An exemplary embodiment of the disclosure provides a light-emitting device including a light conversion layer, wherein the light conversion layer includes the cured product above or the cured product manufactured by the manufacturing method of a cured product above.

FIG. 1 is a diagram of a light emitting device according to an embodiment of the disclosure. The light emitting device 10 includes a substrate 120, a light conversion layer 160 and a backlight module 200. In this embodiment, the light emitting device 10 may further include a light filter layer 140. The light emitting device 10 may further include a polarizing plate, an alignment film, a liquid crystal (not shown), or other elements known to those having ordinary skill in the art, which are not repeated herein.

In this embodiment, the substrate 120 is a light-permeable substrate. The material of the substrate 120 may be glass, organic polymer (for example, polyimide (PI), polyether sulfone (PES), or polycarbonate (PC)) or other suitable materials.

The light filter layer 140 is located under the substrate 120. In this embodiment, the light filter layer 140 may include a red light filter pattern 142, a green light filter pattern 144 and a blue light filter pattern 146. In addition, the light filter layer may further include a plurality of light-shielding patterns 148. There may preferably be a light-shielding pattern 148 between each of the light filter patterns, so that any one of the red filter pattern 142, the green filter pattern 144 and the blue filter pattern 146 is present between every two adjacent light-shielding patterns 148 in the plurality of light-shielding patterns 148. In addition, the red filter pattern 142, the green filter pattern 144 and the blue filter pattern 146 do not include a quantum dot.

The light conversion layer 160 is located under the substrate 120. The light conversion layer 160 is located under the light filter layer 140. The light filter layer 140 is located between the substrate 120 and the light conversion layer 160. The light conversion layer 160 is a light conversion layer formed by the photosensitive resin composition above. In this embodiment, the light conversion layer 160 includes a plurality of pattern layers 160P and a plurality of cured products 168. The plurality of pattern layers 160P includes a red pattern layer 162, a green pattern layer 164 and a scatterer pattern layer 166. There is a cured product 168 between each pattern layers. The plurality of cured products 168 are interposed between the plurality of pattern layers 160P so that one of the pattern layer of the plurality of pattern layers 160P is present between every two adjacent cured products 168 in the plurality of cured products 168. For example, the plurality of cured products 168 are respectively interposed between the red pattern layer 162, the green pattern layer 164 and the scatterer pattern layer 166, that is, one of the red pattern layer 162, the green pattern layer 164 and the scatterer pattern layer 166 is present between every two adjacent cured products 168 in the plurality of cured products 168. Here, the cured product 168 is used as a reflective layer.

The red pattern layer 162 may include a red quantum dot. The green pattern layer 164 may include a green quantum dot. The scatterer pattern layer 166 does not include a quantum dot. In this embodiment, the red pattern layer 162 of the light conversion layer 160 may be disposed corresponding to the red filter pattern 142 of the filter layer 140, the green pattern layer 164 of the light conversion layer 160 may be disposed corresponding to the green filter pattern 144 of the filter layer 140, and the scatterer pattern layer 166 of the light conversion layer 160 may be disposed corresponding to the blue filter pattern 146 of the filter layer 140. For example, the red pattern layer 162 is located under the red light filter pattern 142, the green pattern layer 164 is located under the green light filter pattern 144, and the scatterer pattern layer 166 is located under the blue light filter pattern 146. In addition, the light-shielding pattern 148 in the light filter layer 140 is located on the cured product 168 in the light conversion layer 160.

The backlight module 200 is disposed on a side of the substrate 120 where the light conversion layer 160 is disposed. The backlight module 200 irradiates the light conversion layer 160 with light. For example, the backlight module 200 is suitable for providing a light source, and the light emitted by the light source sequentially passes through the light conversion layer 160, the light filter layer 140, and the substrate 120 to provide a converted light source. In this embodiment, the type of the light source used in the backlight module 200 may include an organic light emitting diode (OLED), a micro-LED, or other suitable light sources. In this embodiment, the backlight module 200 is a light source emitting blue light. After the blue light emitted by the backlight module 200 is absorbed by the red quantum dot in the red pattern layer 162 and the green quantum dot in the green pattern layer 164, converted light may be emitted from the red pattern layer 162 and the green pattern layer 164, respectively. Then, the converted light respectively passes through the red light filter pattern 142 and the green light filter pattern 144 of the light filter layer 140 to emit red light and green light. The blue light emitted by the backlight module 200 directly passes through the scatterer pattern layer 166 without a quantum dot to emit blue light, and then passes through the blue light filter pattern 146 of the light filter layer 140 to emit blue light. For example, when the light emitted by the light source through the light conversion layer 160 and the light filter layer 140 includes visible light (such as red light, green light, and blue light), the light emitting device 10 may be applied to a display panel or other suitable devices. Therefore, the display device of the light emitting device 10 including the light conversion layer formed by the photosensitive resin composition may display better brightness and color purity compared to a conventional display device. However, the disclosure is not limited thereto. In an embodiment, the light filter layer 140 (red light filter pattern 142) does not filter out near-infrared light, and therefore may also be used for applications emitting near-infrared light.

Figure 2:
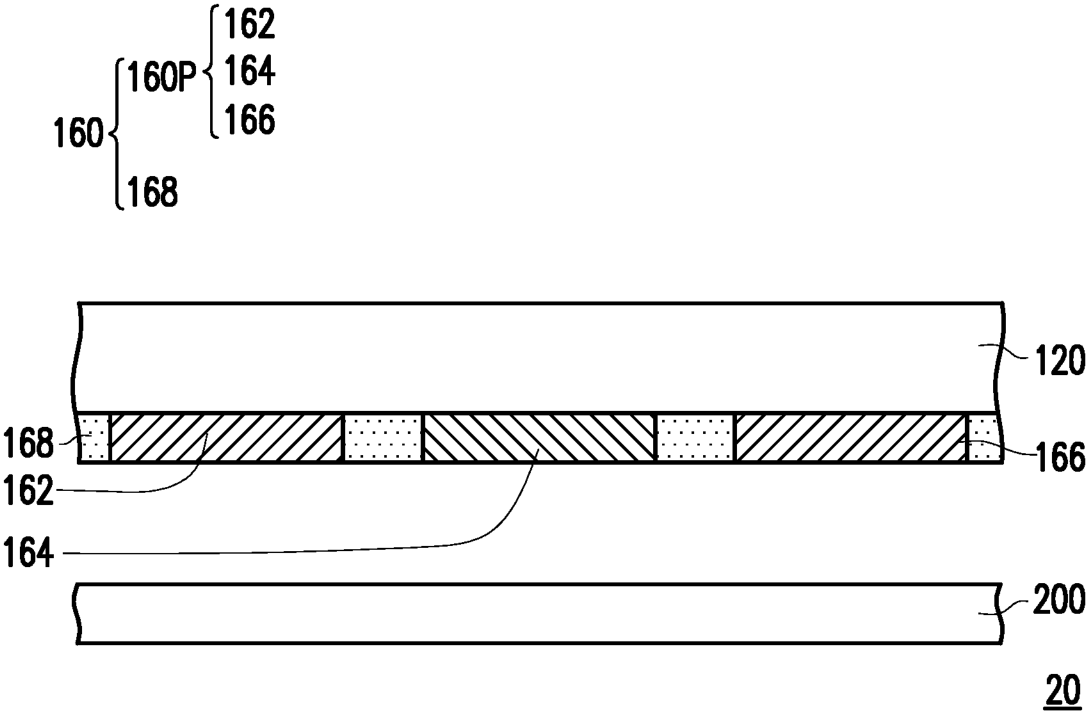
FIG. 2 is a diagram of a light emitting device according to another embodiment of the disclosure.

FIG. 2 is a diagram of a light emitting device according to another embodiment of the disclosure. It should be mentioned here that, the embodiment of FIG. 2 adopts the reference numerals of the embodiment of FIG. 1 and a portion of the contents thereof, wherein the same or similar numerals are used to represent the same or similar elements and descriptions of the same technical contents are omitted. The omitted portions are as described in the embodiments above and are not repeated in the embodiments below.

The main difference between the embodiment of FIG. 2 and the embodiment of FIG. 1 is that a light emitting device 20 does not have the light filter layer 140.

Referring to FIG. 2, the light emitting device 20 includes the substrate 120, the light conversion layer 160, and the backlight module 200. In this embodiment, the light conversion layer 160 is located on the substrate 120, and the light filter layer without a quantum dot is not provided between the light conversion layer 160 and the substrate 120.

In this embodiment, the light emitted by the light source provided by the backlight module 200 sequentially passes through the light conversion layer 160 and the substrate 120 to provide a converted light source. After the blue light emitted by the backlight module 200 is absorbed by the red quantum dot in the red pattern layer 162 and the green quantum dot in the green pattern layer 164, the converted light may be emitted from the red pattern layer 162 and the green pattern layer 164, respectively. The blue light emitted by the backlight module 200 directly passes through the scatterer pattern layer 166 without a quantum dot to emit blue light. For example, when the light emitted by the light source through the light conversion layer 160 includes visible light (such as red light, green light, and blue light), the light emitting device 20 may be applied to a display device or other suitable devices. Therefore, compared with a conventional display device and/or the display device above including the light emitting device 10, the display device including the light emitting device 20 may not only display better brightness and color purity, but may also omit the step of manufacturing the light filter layer to reduce the manufacturing cost of the display device. For example, when the light emitted by the light source through the light conversion layer 160 includes near infrared light (for example, a wavelength of about 780 nm to 800 nm), the light emitting device 20 may be applied to an electromagnetic radiation device or other suitable devices.

Hereinafter, the disclosure is described in detail with reference to Experimental examples. The following Experimental examples are provided to describe the disclosure, and the scope of the disclosure includes the scope of the claims and the substitutes and modifications thereof, and is not limited to the scope of the Experimental examples.

EXAMPLES OF PHOTOSENSITIVE RESIN COMPOSITION AND CURED PRODUCT

Example 1 to Example 10 and Comparative example 1 to Comparative example 10 of the photosensitive resin composition and the cured product are described below:

Example 1 a. Photosensitive Resin Composition 42.83 parts by weight of the resin A-1 (manufactured by Miwon Commercial Co., Ltd.), 57.17 parts by weight of the resin A-5 (manufactured by Miwon Commercial Co., Ltd.), 17 parts by weight of pentaerythritol pentaacrylate, 1.99 parts by weight of pentaerythritol tetrakis(3-mercaptobutyrate), 0.88 parts by weight of the photopolymerization initiator C-1, 0.22 parts by weight of the photopolymerization initiator C-2 and 58.94 parts by weight of $TiO_2$ dispersion (manufactured by Sanyo Color Works, Ltd.) were added in 41.72 parts by weight of butanone. After stirring uniformly with a stirrer, the photosensitive resin composition of Example 1 was obtained.

b. Cured Product

The photosensitive resin composition prepared in Example 1 was coated on a substrate by a spin coating method (spin coater model: MS-A150, manufactured by MIKASA Corporation, rotation speed: about 165 rpm). Then, vacuum dry was performed at a pressure of 65 Pa (vacuum gauge model: GP-2ARY, manufactured by ULVAC Taiwan Inc.) for 1 minute. Next, pre-bake was performed at a temperature of 90° C. for 60 seconds to form a film. Then, a photomask with a long strip penetration pattern with 80 μm×240 μm was placed over the film with a distance about 100 μm between the film surface and the photomask, and then the pre-baked coating film is exposed at 150 mJ/cm$^2$ using a high-pressure mercury lamp including g, h, i lines (model: ELS106SA, manufactured by ELS System Technology Co., Ltd.) to form a semi-finished product. Next, development was performed at a temperature of 23 to 28° C. using $NaHCO_3$ solution having a concentration of 0.1 wt % as a developing solution for 60 seconds. Then, the developed coating film was washed with distilled water and nitrogen gas was blown to dry the coating film. Next, post-bake was performed at 120° C. for 60 minutes to obtain the cured product with a pattern thickness of 8 μm. The obtained cured products were evaluated by each of the following evaluation methods, and the results thereof are as shown in Table 2.

Example 2 to Example 10 and Comparative Example 1 to Comparative Example 10

The photosensitive resin compositions of Example 2 to Example 10 and Comparative example 1 to Comparative example 10 were prepared using the same steps as Example 1, and the difference thereof is: the type and the usage amount of the components of the photosensitive resin compositions were changed (as shown in Table 2), wherein the components/compounds corresponding to the symbols in Table 2 are shown in Table 1. The obtained photosensitive resin compositions were made into cured products and evaluated by each of the following evaluation methods, and the results thereof are as shown in Table 2.

TABLE 1

| | Symbol | Components/compounds |
|---|---|---|
| Resin (A) | A-1 | Resin including the structural unit represented by Formula (A1), the structural unit represented by Formula (A2) and the structural unit represented by Formula (A3), wherein based on a sum of 100 mol % of all the structural units included in resin A-1, the structural unit represented by Formula (A1) is 35 mol % to 45 mol %. A weight average molecular weight is 55,000 to 85,000, and an acid value is 70 mg KOH/g to 80 mg KOH/g (manufactured by Miwon Commercial Co., Ltd.). |
| | A-2 | Resin including the structural unit represented by Formula (A1), the structural unit represented by Formula (A2) and the structural unit represented by Formula (A3), wherein based on a sum of 100 mol % of all the structural units included in resin A-2, the structural unit represented by Formula (A1) is 45 mol % to 55 mol %. A weight average molecular weight is 13,500 to 16,500, and an acid value is 95 mg KOH/g to 105 mg KOH/g (manufactured by Miwon Commercial Co., Ltd.). |
| | A-3 | Resin including the structural unit represented by Formula (A1), the structural unit represented by Formula (A2) and the structural unit represented by Formula (A4), wherein based on a sum of 100 mol % of all the structural units included in resin A-3, the structural unit represented by Formula (A1) is 55 mol % to 65 mol%. A weight average molecular weight is 13,500 to 16,500, and an acid value is 96 mg KOH/g to 106 mg KOH/g (manufactured by Miwon Commercial Co., Ltd.). |
| | A-4 | Resin including the structural unit represented by Formula (A1), the structural unit represented by Formula (A2), the structural unit represented by Formula (A5) and the structural unit represented by Formula (A6), wherein based on a sum of 100 mol % of all the structural units included in resin A-4, the structural unit represented by Formula (A1) is 35 mol % to 45 mol %. A weight average molecular weight is 36,000 to 44,000, and an acid value is 105 mg KOH/g to 115 mg KOH/g (manufactured by Miwon Commercial Co., Ltd.). |
| | A-5 | Resin including the structural unit represented by Formula (A2), the structural unit represented by Formula (A3), the structural unit represented by Formula (A4), the structural unit represented by Formula (A7) and the structural unit represented by Formula (A8). A weight average molecular weight is 8,000 to 11,000, and an acid value is 120 mg KOH/g to 132 mg KOH/g (manufactured by Miwon Commercial Co., Ltd.). |
| | A-6 | Resin including a structural unit represented by Formula (A9), and the terminal being the group represented by Formula (A10) and Formula (A11), wherein * represents a bonding position. |

TABLE 1-continued

| Symbol | Components/compounds |
|---|---|
| | 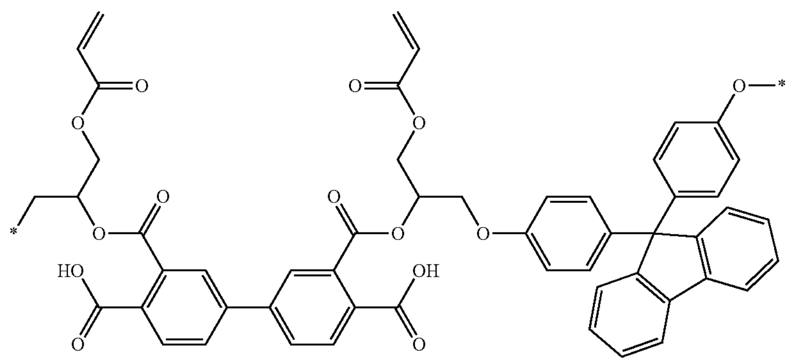 [SMILES: *CC(COC(=O)C=C)OC(=O)c1cc(-c2ccc(C(=O)O)c(C(=O)OC(COC(=O)C=C)COc3ccc(C4(c5ccc(O*)cc5)c5ccccc5-c5ccccc54)cc3)c2)ccc1C(=O)O]<br>Formula (A9)<br>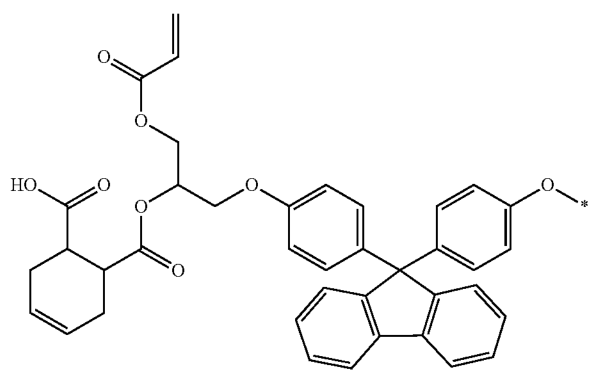 [SMILES: *Oc1ccc(C2(c3ccc(OCC(COC(=O)C=C)OC(=O)C4CC=CCC4C(=O)O)cc3)c3ccccc3-c3ccccc32)cc1]<br>Formula (A10)<br>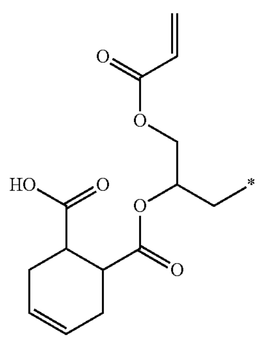 [SMILES: *CC(COC(=O)C=C)OC(=O)C1CC=CCC1C(=O)O]<br>Formula (A11)<br>A weight average molecular weight is 3,000 to 4,000, and an acid value is 93 mg KOH/g to 103 mg KOH/g (manufactured by Miwon Commercial Co., Ltd.). |
| A-7 | Resin including the structural unit represented by Formula (A1), the structural unit represented by Formula (A2), the structural unit represented by Formula (A3), the structural unit represented by Formula (A6) and the structural unit represented by Formula (A12), wherein based on a sum of 100 mol % of all the structural units included in resin A-7, the structural unit represented by Formula (A1) is 20 mol % to 30 mol %. |

TABLE 1-continued

| | Symbol | Components/compounds |
|---|---|---|
| | | 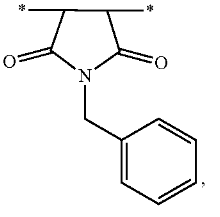 [SMILES: *C1C(=O)N(Cc2ccccc2)C(=O)C1*] Formula (A12) wherein * represents a bonding position. A weight average molecular weight is 11,000 to 13,000, and an acid value is 63 mg KOH/g to 73 mg KOH/g (manufactured by Miwon Commercial Co., Ltd.). |
| Ethylenically unsaturated monomer (B) | B-1 | Pentaerythritol pentaacrylate |
| | B-2 | Pentaerythritol tetrakis(3-mercaptobutyrate) |
| Photopolymerization initiator (C) | C-1 | Compound represented by Formula (C3) as follows. 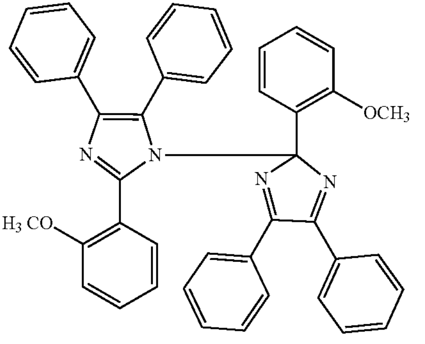 Formula (C3) |
| | C-2 | Compound represented by Formula (C4) as follows. 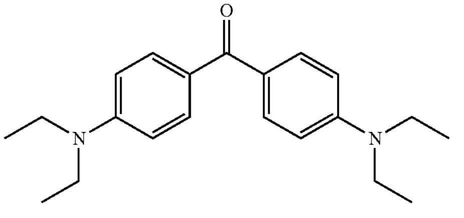 [SMILES: CCN(CC)c1ccc(C(=O)c2ccc(N(CC)CC)cc2)cc1] Formula (C4) |
| | C-3 | Compound represented by Formula (C5) as follows. 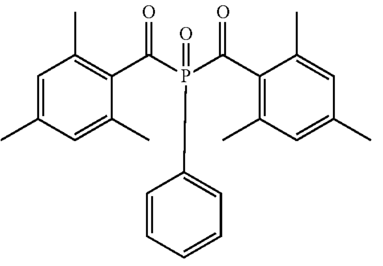 Formula (C5) |

TABLE 1-continued

| | Symbol | Components/compounds |
|---|---|---|
| Pigment (D) | D-1 | $TiO_2$ dispersion (manufactured by Sanyo Color Works, Ltd.). |
| | D-2 | Barium titanate dispersion (manufactured by Tokushiki Co., Ltd.). |
| | D-3 | Zinc oxide dispersion (manufactured by Tokushiki Co., Ltd.). |
| | D-4 | Carbon black dispersion (manufactured by Iridos Co., Ltd.). |
| Solvent (E) | E-1 | Butanone |

TABLE 2

| Component | | Examples | | | | | | | | | |
|---|---|---|---|---|---|---|---|---|---|---|---|
| (unit: parts by weight) | | 1 | 2 | 3 | 4 | 5 | 6 | 7 | 8 | 9 | 10 |
| Resin (A) | A-1 | 42.83 | 69.29 | — | — | — | 42.83 | 42.83 | 42.92 | 20.00 | 20.00 |
| | A-2 | — | — | 48.10 | — | — | — | — | — | — | — |
| | A-3 | — | — | — | 48.20 | — | — | — | — | — | — |
| | A-4 | — | — | — | — | 49.61 | — | — | — | — | — |
| | A-5 | 57.17 | 30.71 | 51.90 | 51.80 | 50.39 | 57.17 | 57.17 | 57.08 | 80.00 | 80.00 |
| | A-6 | — | — | — | — | — | — | — | — | — | — |
| | A-7 | — | — | — | — | — | — | — | — | — | — |
| Ethylenically unsaturated monomer (B) | B-1 | 17.00 | 18.33 | 15.43 | 15.40 | 14.98 | 17.00 | 17.00 | 17.04 | 15.88 | 15.88 |
| | B-2 | 1.99 | 2.14 | 1.80 | 1.80 | 1.75 | 1.99 | 1.99 | 1.99 | 1.86 | 1.86 |
| Photopoly-merization initiator (C) | C-1 | 0.88 | 0.95 | 0.80 | 0.80 | 0.78 | 0.88 | 0.88 | 0.88 | 0.82 | 0.82 |
| | C-2 | 0.22 | 0.24 | 0.20 | 0.20 | 0.19 | 0.22 | 0.22 | 0.22 | 0.21 | 0.21 |
| | C-3 | — | — | — | — | — | — | — | — | — | — |
| Pigment (D) | D-1 | 58.94 | 63.57 | 53.51 | 53.40 | 51.95 | — | — | 59.07 | 55.05 | 55.05 |
| | D-2 | — | — | — | — | — | 58.94 | — | — | — | — |
| | D-3 | — | — | — | — | — | — | 58.94 | — | — | — |
| | D-4 | — | — | — | — | — | — | — | 0.22 | — | — |
| Solvent (E) | E-1 | 41.72 | 52.86 | 28.66 | 28.40 | 24.90 | 41.72 | 41.72 | 41.81 | 32.37 | 32.37 |
| Post-bake temperature (° C.) | | 120 | 120 | 120 | 120 | 120 | 120 | 120 | 120 | 120 | 150 |
| Evaluation results | Ink exudative resistance | ○ | ○ | ○ | ○ | ○ | ○ | ○ | ○ | Δ | ○ |
| | Ink infiltration resistance | ○ | ○ | ○ | ○ | ○ | ○ | ○ | ○ | ○ | ○ |

| Component | | Comparative examples | | | | | | | | | |
|---|---|---|---|---|---|---|---|---|---|---|---|
| (unit: parts by weight) | | 1 | 2 | 3 | 4 | 5 | 6 | 7 | 8 | 9 | 10 |
| Resin (A) | A-1 | 42.83 | 42.83 | 42.83 | 20.00 | — | — | — | 20.00 | 20.00 | — |
| | A-2 | — | — | — | — | — | — | — | — | — | — |
| | A-3 | — | — | — | — | — | — | — | — | — | — |
| | A-4 | — | — | — | — | — | — | — | — | — | — |
| | A-5 | 57.17 | 57.17 | 57.17 | 80.00 | 59.95 | 59.95 | 57.68 | 80.00 | 80.00 | 57.68 |
| | A-6 | — | — | — | — | 40.05 | 40.05 | — | — | — | — |
| | A-7 | — | — | — | — | — | — | 42.32 | — | — | 42.32 |
| Ethylenically unsaturated monomer (B) | B-1 | 17.00 | 17.00 | 17.00 | 15.88 | 17.82 | 17.82 | 17.15 | 15.88 | 15.88 | 17.15 |
| | B-2 | 1.99 | 1.99 | 1.99 | 1.86 | 2.08 | 2.08 | 2.00 | 1.86 | 1.86 | 2.00 |
| Photopoly-merization initiator (C) | C-1 | 1.10 | — | — | — | — | 0.93 | 0.89 | — | — | — |
| | C-2 | — | 0.22 | — | — | — | 0.23 | 0.22 | — | — | — |
| | C-3 | — | 0.88 | 1.10 | 1.03 | 1.16 | — | — | 1.03 | 1.03 | 1.11 |
| Pigment (D) | D-1 | 58.94 | 58.94 | 58.94 | 55.05 | 61.81 | 61.81 | 59.47 | 55.05 | 55.05 | 59.47 |
| | D-2 | — | — | — | — | — | — | — | — | — | — |
| | D-3 | — | — | — | — | — | — | — | — | — | — |
| | D-4 | — | — | — | — | — | — | — | — | — | — |
| Solvent (E) | E-1 | 41.72 | 41.72 | 41.72 | 32.37 | 48.61 | 48.61 | 42.98 | 32.37 | 32.37 | 42.98 |
| Post-bake temperature (° C.) | | 120 | 120 | 120 | 120 | 120 | 120 | 120 | 150 | 230 | 230 |
| Evaluation results | Ink exudative resistance | ○ | ○ | ○ | Δ | X | X | X | Δ | ○ | Δ |
| | Ink infiltration resistance | X | X | X | X | X | X | X | X | ○ | ○ |

<Evaluation Methods>

Preparation Method of Ink Composition

Based on a usage amount of 100 parts by weight of the ink position, 34.5 parts by weight of ethyl diglycol acetate (EDGAC), 34.5 parts by weight of 2-acetoxy-1-methoxy-propane (Propylene glycol monomethyl ether acetate, PGMEA), 3.2 parts by weight of $TiO_2$ dispersion, 1.8 parts by weight of Irgacure OXE01 (trade name; manufactured by BASF Taiwan Ltd.), 6.1 parts by weight of dipentaerythritol hexaacrylate (DPHA), 11.9 parts by weight of the resin A-3 and 8.0 parts by weight of the red quantum dot were added in the stirrer. After stirring uniformly with a stirrer, the liquid ink composition was obtained.

a. Ink Exudative Resistance

Figure 3:
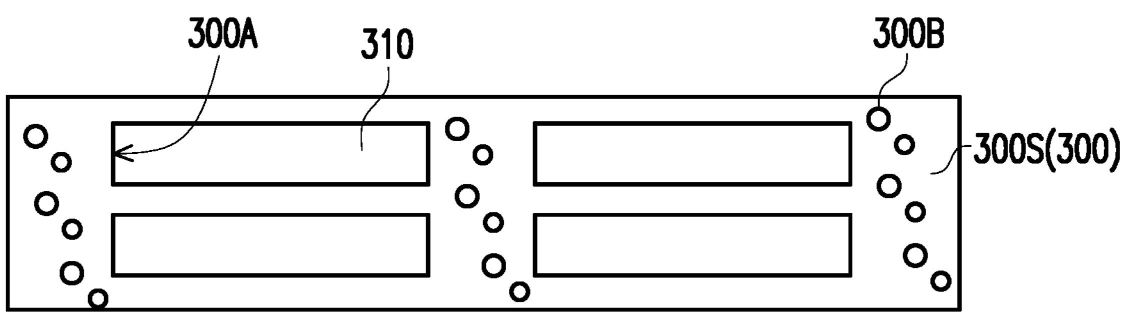
FIG. 3 is a diagram for evaluating the ink exudative resistance of the disclosure.

The prepared ink composition was sprayed by a nanomaterial jet printer (model: DMP-2850, manufactured by FUJIFILM Dimatix, Inc.) to an opening pattern (dimensions of 80 μm×240 μm) of the cured product having a thickness of 8 μm to make the thickness of the ink composition to about 6 μm. Next, the surface of the cured product was observed via an optical microscope (model: MX61, manufactured by Olympus Corporation). When the ink composition 310 stays in the opening pattern 300A of the cured product 300 for a long time and the bubbles 300B observed on the surface 300S of the cured product are less (as shown in FIG. 3), it shows that the ink composition is difficult to seep out from the surface of the cured product, that is, the cured product has good ink exudative resistance.

The Evaluation Criteria of Ink Exudative Resistance are as Follows:

- ○: 60 minutes<dwell time, and no bubbles was observed on the surface of the cured product;
- Δ: 30 minutes<dwell time<60 minutes, and few bubbles were observed on the surface of the cured product;
- x: dwell time<30 minutes, and lots of bubbles were observed on the surface of the cured product.

b. Ink Infiltration Resistance

Figure 4A:
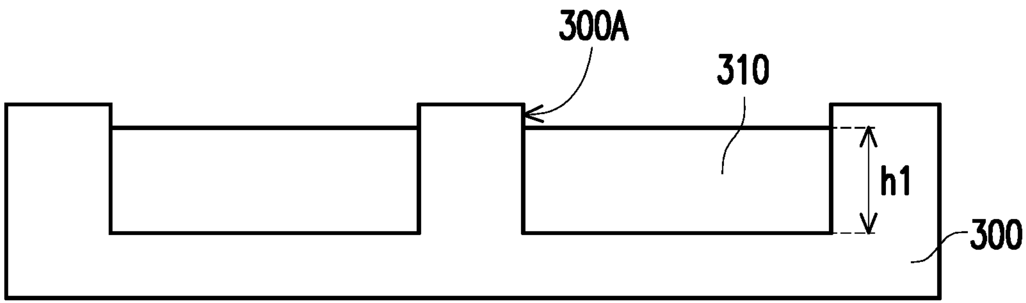
FIG. 4A and FIG. 4B are diagrams for evaluating the ink infiltration resistance of the disclosure.
Figure 4B:
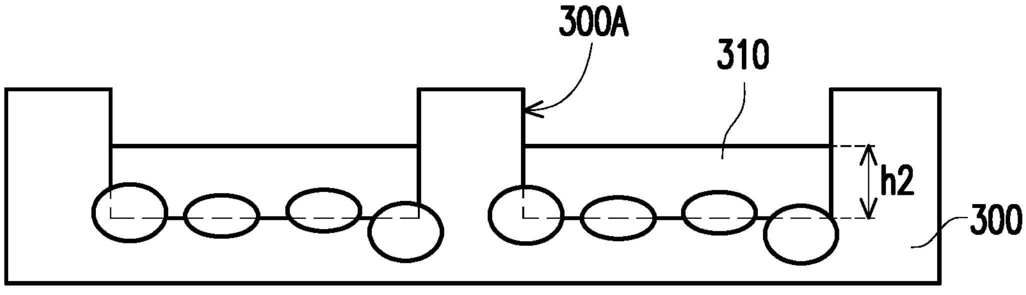

The prepared ink composition was sprayed by a nanomaterial jet printer (model: DMP-2850, manufactured by FUJIFILM Dimatix, Inc.) to an opening pattern (dimensions of 80 μm×240 μm) of the cured product having a thickness of 8 μm to make the thickness of the ink composition to about 6 μm. Next, an initial film thickness h1 and a film thickness h2 after staying for 30 minutes of the ink composition 310 in the opening pattern 300A of the cured product 300 (as shown in FIG. 4A and FIG. 4B) were observed via a color 3D laser microscope (model: VK-9700, manufactured by KEYENCE TAIWAN CO., LTD.). Then, a film thickness change rate is calculated according to the formula as follows. When the film thickness change rate is small, it shows that the ink composition is difficult to infiltrate in the cured product, that is, the cured product has good ink infiltration resistance.

$$\text{film thickness change rate (\%)} = \frac{h1 - h2}{h1} \times 100\%$$

The Evaluation Criteria of Ink Infiltration Resistance are as Follows:

- ○: film thickness change rate≤5%;
- x: 5%<film thickness change rate.

<Evaluation Results>

It may be seen from Table 2 that the cured products formed by the photosensitive resin composition including the alkali-soluble resin (A-1) having the structural units with a specific structure and the photopolymerization initiator (C) including the compound represented by Formula (C1) at a post-bake temperature of less than or equal to 150° C. (Examples 1 to 10) have good ink exudative resistance and ink infiltration resistance, and may be suitable for the light conversion layer and the light emitting device. In contrast, the cured products formed by the photosensitive resin composition in which the photosensitive resin composition does not include the alkali-soluble resin (A-1) having the structural units with a specific structure at a post-bake temperature of less than or equal to 150° C. (Comparative examples 5 and 6) have poor ink exudative resistance and ink infiltration resistance. In addition, when the photopolymerization initiator (C) of the photosensitive resin composition does not include the compound represented by Formula (C1), the cured products formed thereby at a post-bake temperature of less than or equal to 150° C. (Comparative examples 2 to 5 and 8) have poor ink exudative resistance and/or ink infiltration resistance.

In addition, when the weight average molecular weight of each resin in the alkali-soluble resin (A-1) of the photosensitive resin composition is greater than 13,000 and less than or equal to 85,000, the cured products formed thereby at a post-bake temperature of less than or equal to 150° C. (Examples 1 to 10) have good ink exudative resistance and/or ink infiltration resistance. In contrast, when the weight average molecular weight of each resin in the alkali-soluble resin (A-1) of the photosensitive resin composition is less than or equal to 13,000 or greater than 85,000, the cured product formed thereby at a post-bake temperature of less than or equal to 150° C. (Comparative example 7) have poor ink exudative resistance and/or ink infiltration resistance.

In addition, when the photopolymerization initiator (C) of the photosensitive resin composition further includes the compound represented by Formula (C2), the cured products formed thereby at a post-bake temperature of less than or equal to 150° C. (Examples 1 to 10) have good ink exudative resistance and/or ink infiltration resistance. In contrast, when the photopolymerization initiator (C) of the photosensitive resin composition does not include the compound represented by Formula (C2), the cured product formed thereby at a post-bake temperature of less than or equal to 150° C. (Comparative examples 1, 3 to 5 and 8) have poor ink exudative resistance and/or ink infiltration resistance.

In addition, when the alkali-soluble resin (A-1) of the photosensitive resin composition does not include the structural unit having the specific structure (Comparative examples 5, 6 and 10), compared to the cured products formed by the photosensitive resin composition at a post-bake temperature of less than or equal to 150° C. (Comparative examples 5 and 6), the cured product formed by the photosensitive resin composition at a post-bake temperature of greater than 150° C. (Comparative example 10) has better ink exudative resistance and ink infiltration resistance.

In addition, when the photopolymerization initiator (C) of the photosensitive resin composition does not include the compound represented by Formula (C1) (Comparative examples 2 to 5 and 8 to 10), compared to the cured products formed by the photosensitive resin composition at a post-bake temperature of less than or equal to 150° C. (Comparative examples 2 to 5 and 8), the cured products formed by the photosensitive resin composition at a post-bake temperature of greater than 150° C. (Comparative examples 9 to 10) have better ink exudative resistance and/or ink infiltration resistance.

Based on the above, when the photosensitive resin composition of the disclosure includes the alkali-soluble resin (A-1) having the structural unit with the specific structure and the photopolymerization initiator (C) including the compound represented by Formula (C1), the cured product formed by the photosensitive resin composition at a post-bake temperature of less than or equal to 150° C. has good ink exudative resistance and ink infiltration resistance, and suitable for a light conversion layer and a light emitting device, thereby improving the performance of a light emitting device. In addition, the photosensitive resin composition of the disclosure is also suitable for forming a cured product at a post-bake temperature of greater than 150° C. for which the cured product has good ink exudative resistance and ink infiltration resistance, and suitable for a light conversion layer and a light emitting device.

Although the disclosure has been disclosed in the embodiments above, they are not intended to limit the disclosure. Anyone with ordinary knowledge in the relevant technical field can make changes and modifications without departing from the spirit and scope of the disclosure. The scope of protection of the disclosure shall be subject to those defined by the claims attached.

What is claimed is:

1. A photosensitive resin composition, comprising:

a resin (A) comprising an alkali-soluble resin (A-1), another resin (A-2) or a combination thereof, the alkali-soluble resin (A-1) comprising a structural unit represented by Formula (A1) as follows:

Formula (A1)

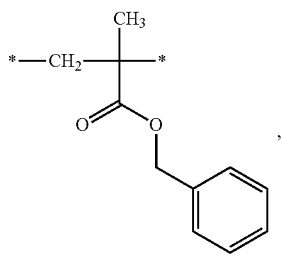

, wherein * represents a bonding position;

an ethylenically unsaturated monomer (B);

a photopolymerization initiator (C) comprising a compound represented by Formula (C1) and a compound represented by Formula (C2) as follows;

a pigment (D); and a solvent (E):

Formula (C1)

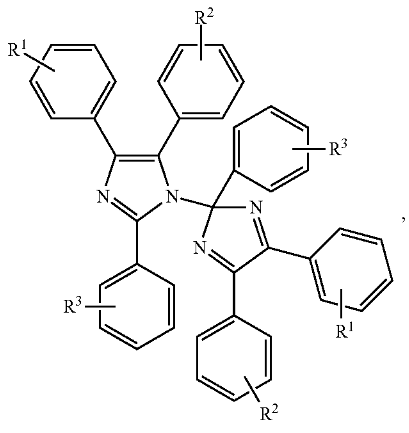

, in Formula (C1), $R^1$ represents hydrogen or methoxy group, $R^2$ represents hydrogen, fluorine, chlorine, bromine, methyl group or methoxy group, $R^3$ represents fluorine, chlorine, bromine, methyl group or methoxy group, Formula (C2)

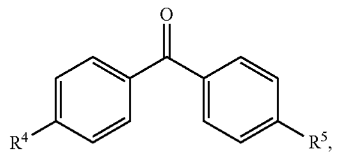

in Formula (C2), $R^4$ and $R^5$ each represent methylamino group, ethylamino group, cyclohexylamino group, hydroxyethylamino group, methoxy group, methylethylamino group or diethylamino group.

2. The photosensitive resin composition according to claim 1, wherein a weight average molecular weight of a resin in the alkali-soluble resin (A-1) is greater than 13,000 and less than or equal to 85,000.

3. The photosensitive resin composition according to claim 1, wherein an acid value of the alkali-soluble resin (A-1) is 60 mgKOH/g to 135 mgKOH/g, an acid value of another resin (A-2) is 60 mgKOH/g to 135 mgKOH/g.

4. The photosensitive resin composition according to claim 1, wherein the alkali-soluble resin (A-1) comprises one or more alkali-soluble resin comprising the structural unit represented by Formula (A1), in the alkali-soluble resin (A-1), based on a sum of 100 mol % of all structural units comprised in each alkali-soluble resin in which the alkali-soluble resin comprises the structural unit represented by Formula (A1), the structural unit represented by Formula (A1) is 35 mol % to 65 mol %.

5. The photosensitive resin composition according to claim 1, wherein the ethylenically unsaturated monomer (B) comprises alkyl (meth)acrylate, hydroxyl-containing (meth) acrylate, ether group-containing (meth)acrylate, alicyclic (meth)acrylate, or a combination thereof.

6. The photosensitive resin composition according to claim 1, wherein the ethylenically unsaturated monomer (B) comprises (meth)acrylic acid, methyl (meth)acrylate, ethyl (meth)acrylate, propyl (meth)acrylate, butyl (meth)acrylate, tert-butyl (meth)acrylate, lauryl (meth)acrylate, hydroxyethyl (meth)acrylate, hydroxypropyl (meth)acrylate, ethoxyethyl meth)acrylate, glycidyl (meth)acrylate, cyclohexyl (meth)acrylate, dicyclopentadienyl (meth)acrylate, or a combination thereof.

7. The photosensitive resin composition according to claim 1, wherein in the photopolymerization initiator (C), a weight ratio of a usage amount of the compound represented by Formula (C1) to a usage amount of the compound represented by Formula (C2) is 5:1 to 2:1.

8. The photosensitive resin composition according to claim 1, wherein the pigment (D) comprises a white pigment (D-1), the white pigment (D-1) is at least one selected from the group consisting of titanium oxide, silicon oxide, barium titanate, zirconium oxide, zinc oxide, aluminum oxide, magnesium oxide, antimony oxide, aluminum hydroxide, magnesium hydroxide, barium sulfate, calcium sulfate, magnesium carbonate, barium carbonate, calcium carbonate, strontium titanate, aluminum powder, kaolin, clay, talcum powder, and montmorillonite.

9. The photosensitive resin composition according to claim 8, wherein the pigment (D) further comprises a black pigment (D-2), the black pigment (D-2) is at least one selected from the group consisting of carbon black, chromium oxide, iron oxide, and titanium black.

10. The photosensitive resin composition according to claim 1, wherein the solvent (E) comprises a low boiling point solvent (E-1), a boiling point of the low boiling point solvent (E-1) is 100° C. or less.

11. The photosensitive resin composition according to claim 10, wherein based on a usage amount of 100 parts by weight of the solvent (E), a usage amount of the low boiling point solvent (E-1) is 25 parts by weight to 100 parts by weight.

12. The photosensitive resin composition according to claim 1, further comprising a surfactant (F), wherein based on a usage amount of 100 parts by weight of the resin (A), a usage amount of the surfactant (F) is 1 part by weight to 5 parts by weight.

13. The photosensitive resin composition according to claim 1, further comprising a surfactant (F), wherein the surfactant (F) comprises a fluorine-based surfactant.

14. The photosensitive resin composition according to claim 1, wherein based on a usage amount of 100 parts by weight of the resin (A), a usage amount of the ethylenically unsaturated monomer (B) is 5 parts by weight to 25 parts by weight, a usage amount of the photopolymerization initiator (C) is 0.1 parts by weight to 5 parts by weight, a usage amount of the pigment (D) is 45 parts by weight to 65 parts by weight, and a usage amount of the solvent (E) is 20 parts by weight to 65 parts by weight.

15. A cured product formed by curing the photosensitive resin composition according to claim 1.

16. A manufacturing method of a cured product, comprising:

performing post-bake for the photosensitive resin composition according to claim 1, a temperature of the post-bake is less than or equal to 150° C.

17. A light conversion layer, comprising the cured product according to claim 15.

18. The light conversion layer according to claim 17, the cured product is a plurality of cured products, the light conversion layer further comprises a plurality of pattern layers, wherein a plurality of the cured products are interposed between a plurality of the pattern layers, so that one of a plurality of the pattern layers is present between every two adjacent cured products in a plurality of the cured products.

19. The light conversion layer according to claim 17, further comprising a plurality of pattern layers, wherein the pattern layers are a red pattern layer, a green pattern layer, or a scatterer pattern layer.

20. A light emitting device, comprising the light conversion layer according to claim 18.

21. The light emitting device according to claim 20, further comprising:

a substrate, the light conversion layer is located on the substrate; and a backlight module disposed on a side of the substrate where the light conversion layer is disposed.

22. The light emitting device according to claim 21, further comprising a light filter layer, the light filter layer is located between the substrate and the light conversion layer.

* * * * *